Figures 1, 2:
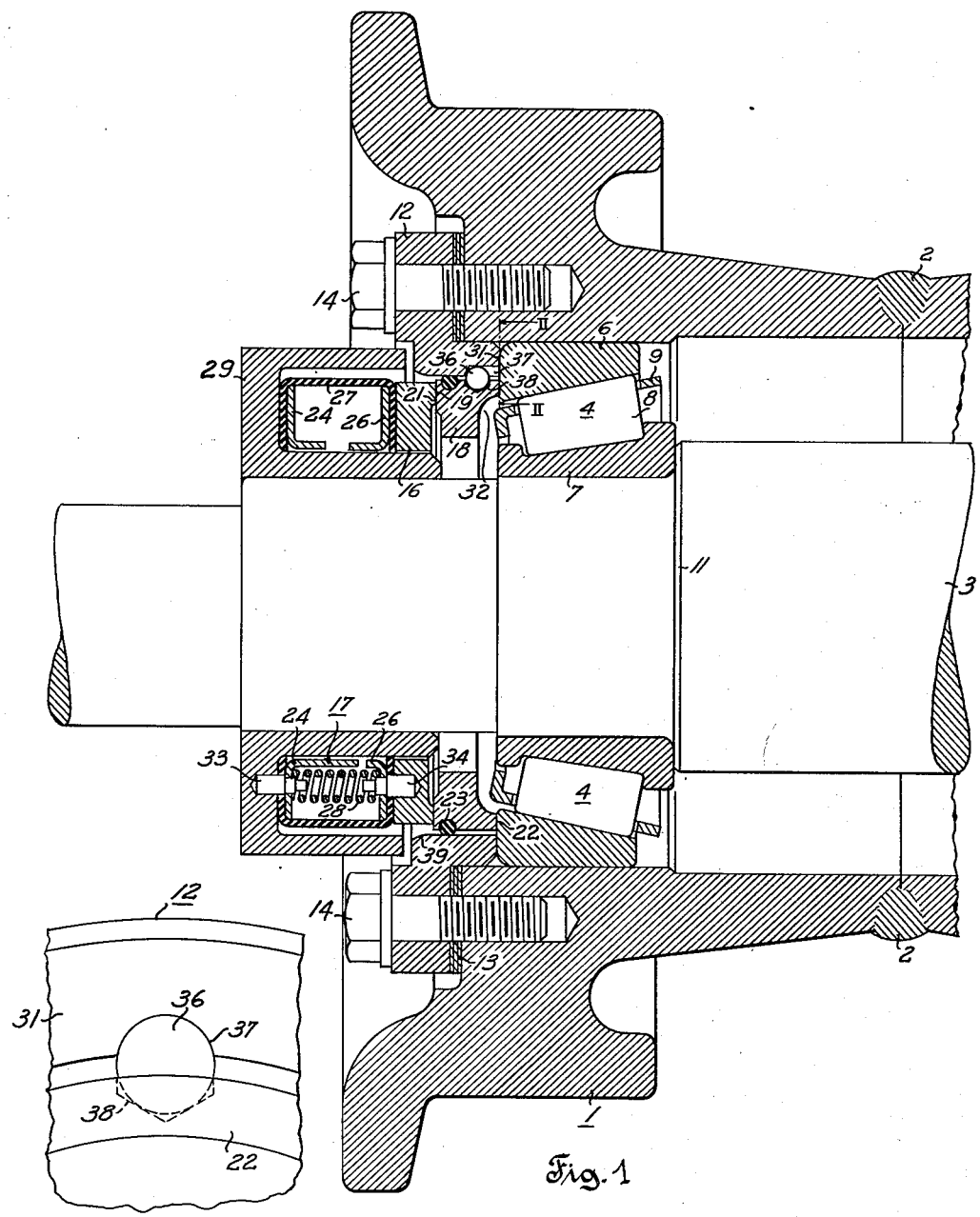

Jan. 26, 1954

F. A. SCHICK 2,667,388

BEARING AND SEAL ASSEMBLY

Filed May 24, 1950

Inventor
Frederick A. Schick
by
Attorney

Patented Jan. 26, 1954

2,667,388

UNITED STATES PATENT OFFICE 2,667,388

BEARING AND SEAL ASSEMBLY

Frederick A. Schick, Springfield, Ill., assignor to Allis-Chalmers Manufacturing Company, Milwaukee, Wis.

Application May 24, 1950, Serial No. 163,881

5 Claims. (Cl. 308—187.1)

The invention relates to sealed bearings for connecting relatively rotatable parts in load transmitting and sealed relation with each other. More particularly, the invention is concerned with an improved bearing and seal assembly comprising an annular antifriction bearing and an axial contact type seal unit at one side of said antifriction bearing.

In track rollers for crawler tractors, as disclosed for instance in U. S. Patent 2,283,871, May 19, 1942, E. F. Norelius, Bearing, a pair of conical roller bearings and a pair of axial contact seal units have heretofore been employed to rotatably mount the roller on a stationary shaft in radial and axial load transmitting relation to the latter and to store a supply of lubricant for flooding the bearings, in an annular space between the shaft and the roller. An extremely high degree of precision in the construction of the axial contact seals is required in order to maintain the stored lubricant without appreciable loss within the roller for long periods of operation, such as one thousand hours or more, and a precision seal adapted for that purpose is disclosed, for instance in my prior U. S. Patent 2,358,830, September 26, 1944, Track Roller Seal.

Generally, it is an object of the invention to provide an improved bearing and seal assembly which may readily be constructed with the hereinbefore mentioned high degree of precision.

More specifically, it is an object of the invention to provide an improved bearing and seal assembly incorporating an antifriction bearing and an axial contact seal unit, and which assembly requires less axial space for the seal unit than the bearing and seal assemblies disclosed in the hereinbefore mentioned U. S. Patents 2,283,871 and 2,358,830.

Another object of the invention is to provide an improved bearing and seal assembly of the hereinbefore outlined character which is simpler and lends itself to manufacture at lower costs than the bearing and seal assemblies disclosed in the hereinbefore mentioned prior patents.

A further object of the invention is to provide an improved bearing and seal assembly of the hereinbefore outlined character which avoids certain undesirable performance characteristics of the bearing and seal assemblies disclosed in the hereinbefore mentioned prior patents.

The foregoing and other objects and advantages are attained by the present invention, various novel features of which will be apparent from the description herein and the accompanying drawing disclosing an embodiment of the invention, and will be more particularly pointed out in the appended claims.

Referring to the drawing:

Fig. 1 is a sectional view of part of a track roller installation for crawler tractors; and Fig. 2 is an enlarged, partial end view on line II—II of Fig. 1.

The reference character 1 in Fig. 1 designates one of two symmetrical wheel sections of a track roller of conventional construction and in which the two wheel sections are rigidly connected with each other by a circumferential welded seam midway between the opposite ends of the roller as indicated at 2. The roller is rotatably mounted on a shaft 3 by means of a conical roller bearing, generally designated by the reference character 4, within the wheel section 1, and by means of another conical roller bearing, not shown, within the other wheel section.

The roller bearing 4 comprises an internally coned outer race 6, an externally coned inner race 7, an annular series of rollers 8 between said races, and a roller cage 9 between the races 6 and 7 for maintaining the rollers 8 in circumferentially spaced relation to each other. The inner race 7 is fitted upon a cylindrical, diametrically reduced portion of the shaft 3 and bears at its wide end against a shoulder 11 of the shaft 3 at the axially inner side of the bearing 4. The outer race 6 of the bearing 4 is telescopically fitted into a cylindrical bore of the wheel section 1, and in the assembled condition of the parts as shown in Fig. 1, the outer race 6 is axially positioned relative to the inner race 7 so as to transmit axially inward and radial thrust loads from the wheel section 1 to the shaft 3 without appreciable play.

The wide end of the outer race 6 bears against an annular retainer 12 which has an axially extending sleeve portion within the bore of the wheel section 1 and a radial flange portion at the axially outer side of the wheel section 1. Shims 13 are interposed between the radial flange of the retainer 12 and the wheel section 1 for purposes of adjustment, and a circumferential series of cap screws 14 extend through the radial flange of the retainer 12 and shims 13 into the wheel section 1 for securing the retainer 12 to the wheel section 1.

As mentioned hereinbefore, another roller bearing, not shown, is operatively interposed between the shaft 3 and the other wheel section of the roller, and it will be understood that the foregoing explanations with respect to the mounting of the conical roller bearing 4 similarly apply to the roller bearing not shown at the other end of the roller, except that the taper of the roller bearing at the other end of the roller is reversed relative to the taper of the roller bearing 4 in conformity with conventional practice, so as to retain the track roller on the shaft 3 for rotation relative thereto without appreciable radial and axial play.

An axial contact seal unit at the axially outer side of the roller bearing 4 comprises an axially shiftable sealing ring 16, resilient backing means for said sealing ring, generally designated by the reference character 17, and an abutment ring 18 which has a radial sealing surface 19 at one side thereof in axial contact with an annular sealing lip 21 of the sealing ring 16, and an annular end face 22 in axial contact with the annular end face of the outer bearing race 6 at the wide end of the latter.

The abutment ring 18 is mounted on the retainer 12 in axially shiftable relation to the latter by means which, in the illustrated embodiment of the invention, comprise a ring 23 of rubber like material which surrounds the sealing ring and radially contacts an inner cylindrical surface of the retainer 12, the ring 23 being seated in an annular groove of the abutment ring 18.

The resilient backing means 17 for the sealing ring 16, as shown in Fig. 1, are of the same general character as disclosed in the hereinbefore mentioned earlier Patent 2,358,830, in that they comprise a pair of interdigitated skeleton rings 24 and 26, and outside wrap-around seal boot 27, and a circumferential series of coil springs 28, one of which is shown in the lower part of Fig. 1. An annular trough casing 29 which forms part of the axial contact seal unit is press fitted upon a cylindrical radially reduced portion of the shaft 3 at the axially outer side of the roller bearing 4.

Referring again to the abutment ring 18, it will be noted that the outside diameter of the annular end face 22 of said abutment ring is smaller than the outside diameter and larger than the inside diameter of the annular end face of the outer race 6 at the wide end of the latter. The axial sleeve portion of the retainer 12 has an end face 31 in axial contact with a portion of the end face of the outer race 6 which extends beyond the end face 22 of the abutment ring 18.

The axially opposite end faces 19 and 22 of the abutment ring 18 may readily be formed in accurate parallel relation to each other and with any desired degree of finish. The annular end face of the outer bearing race 6 at the wide end of the latter is accurately finished during the manufacture of the roller bearing, and, therefore, provides a satisfactory seat for the annular end face 22 of the abutment ring 18 without extra cost.

As shown in Fig. 1, the roller cage 9 of the bearing 4 has a portion at the axially outer side of the bearing which projects beyond the plane of the end face of the outer race 6 at the wide end of the latter and toward the sealing ring 18. In order to provide clearance for such projecting portion of the roller cage 9 and permit rotation of the latter relative to the abutment ring 18, an annular recess 32 is formed on the abutment ring 18 at the side of the latter which faces the roller bearing 4.

In operation of the track roller, the sealing ring 16 is retained in nonrotatable relation to the shaft 3 by the interdigitated skeleton rings 24 and 26 and dowel pins 33 and 34, in conformity with established practice, and the abutment ring 18 is caused to rotate in unison with the wheel section 1 relative to the sealing ring 16. In actual practice, it has been observed that frictional engagement of the resilient ring 23 with the inner surface of the retainer 12 is insufficient, under certain conditions, to establish an adequate torque transmitting connection between the retainer 12 and the abutment ring 18. For instance, if caked mud or ice should be present at the outer periphery of the sealing ring 16 and adhere to the abutment ring 18, the latter may tend to remain stationary while the track roller rotates, with consequent damaging results to the resilient ring 23 and, therefore, to the seal assembly as a whole. In order to overcome this difficulty, the abutment ring 18 is connected in positively driven relation with the retainer 12 by means of a steel ball 36 which is seated in radially opposite recesses 37 and 38 which are formed at the inner periphery of the retainer 12 and at the outer periphery of the abutment ring 18, respectively. One of said recesses, in the present instance the recess 37 of the retainer 12, is elongated in the direction of axial movement of said abutment ring, and permits back and forth movement of the ball 36 within the elongated recess 37, so as to accommodate axial movement of the ring 18 into abutting engagement with the end face of the outer race 6 at the wide end of the latter under the action of the springs 28 which urge the sealing ring 16 axially against the abutment ring 18.

In order to assemble the retainer 12 and the abutment ring 18, the resilient ring 23 is first placed into the annular groove of the abutment ring 18, and the assembled rings 18 and 23 are then moved axially into the retainer 12 from the side of the latter, which in Fig. 1 faces the trough casing 29. In order to facilitate entry of the resilient ring 23 into the retainer 12 the inner periphery of the latter is flared outwardly, as shown at 39. Insertion of the ball 36 into the recesses 37 and 38 is accomplished by pushing the abutment ring 18 somewhat beyond the end face 22 of the retainer 12 so as to expose the recess 38 for insertion of the ball, care being taken that the recesses 37 and 38 register radially with each other. After the ball has been inserted into the recesses 37 and 38, the abutment ring 18 is pushed back toward the flared end of the retainer, and the ball will then be unable to fall out of the recesses during manipulation of the assembled retainer and abutment ring.

As to the axial space which is required by the axial contact seal unit at the axially outer side of the roller bearing 4, it will be noted that such axial space is relatively short because of the fact that the abutment ring 18 bears directly against the outer race 6 of the roller bearing, and not against an intermediate shoulder as heretofore employed and as shown, for instance, in my earlier Patent 2,358,830. The saving of axial space at the outer side of the roller bearing 4 is particularly desirable in track rollers and similar installations which require the widest possible spacing between a pair of roller bearings within an axial space of given length.

It should be understood that it is not intended to limit the invention to the particular form and details described hereinbefore, and that the invention includes such other forms and modifications as are embraced by the scope of the appended claims.

It is claimed and desired to secure by Letters Patent:

1. In combination with a pair of relatively rotatable radially inner and outer parts, an antifriction bearing having an annular inner race connected in radial and axial thrust transmitting relation with said inner part, and annular outer race connected in radial thrust transmitting relation with said outer part, and an annular series of antifriction bodies operatively interposed between said inner and outer races; an axial contact seal unit at one side of said antifriction bearing comprising an axially shiftable sealing ring, resilient backing means for said sealing ring at the side of the latter remote from said antifriction bearing, and an abutment ring having a radial sealing surface at one side thereof in axial contact with said sealing ring, and an annular end face at its other side in axial contact with an annular end face of said outer race, the outside diameter of said annular end face of said abutment ring being smaller than the outside diameter and larger than the inside diameter of said annular end face of said outer race; an annular retainer having an end face in axial contact with the portion of said end face of said outer race which extends beyond said end face of said abutment ring, connecting means between said outer part and said retainer operative to secure said retainer in axially fixed relation to said outer part; and means for mounting said abutment ring within said retainer in axially shiftable relation to the latter.

2. The combination set forth in claim 1, in which said means for mounting said abutment ring within said retainer comprise a ring of rubber like material surrounding said abutment ring and radially contacting an inner cylindrical surface of said retainer.

3. The combination set forth in claim 2, in which said means for mounting said abutment ring within said retainer further comprise a ball element seated in radially opposite recesses formed at the inner periphery of said retainer and at the outer periphery of said abutment ring, respectively, so as to secure said abutment ring against rotation relative to said retainer, one of said recesses being elongated in the direction of axial movement of said abutment ring to permit back and forth movement of said ball element within said elongated recess in said direction.

4. In combination with a pair of relatively rotatable radially inner and outer parts, an antifriction bearing comprising a coned race member connected in radial thrust transmitting relation with one of said parts, a complementary race member connected in radial and axial thrust transmitting relation with the other of said parts, and an annular series of load transmitting rollers operatively interposed between said race members; an axial contact seal unit at the wide end of said coned race member and comprising an axially shiftable sealing ring, resilient backing means for said sealing ring at the side of the latter remote from said bearing, and an abutment ring having a radial sealing surface at one side thereof in axial contact with said sealing ring, and an annular end face at its other side in axial contact with an annular end face of said coned race member at said wide end of the latter, said end face of said coned race member having a portion extending radially beyond said end face of said abutment ring; an annular retainer having an end face in axial contact with said radially extending portion of said end face of said coned race member; connecting means between said one of said relatively rotatable parts and said retainer operative to secure said retainer in axially fixed relation to said one part; and means for mounting said abutment ring on said retainer in axially shiftable relation to the latter.

5. In combination with a pair of relatively rotatable radially inner and outer parts, an antifriction bearing having an internally coned outer race connected in radial thrust transmitting relation with said outer part, an externally coned inner race connected in radial and axial thrust transmitting relation with said inner part, and an annular series of load transmitting rollers operatively interposed between said races; an axial contact seal unit at the wide end of said outer race comprising an axially shiftable sealing ring, resilient backing means for said sealing ring at the side of the latter remote from said bearing, and an abutment ring having a radial sealing surface at one side thereof in axial contact with said sealing ring, and an annular end face at its other side in axial contact with an annular end face of said outer race at said wide end of the latter, the outside diameter of said annular end face of said abutment ring being smaller than the outside diameter and larger than the inside diameter of said annular end face of said outer race; an annular retainer having an end face in axial contact with the portion of said end face of said outer race which extends beyond said end face of said abutment ring; connecting means between said outer part and said retainer operative to secure said retainer in axially fixed relation to said outer part; and means for mounting said abutment ring within said retainer in axially shiftable relation to the latter.

FREDERICK A. SCHICK.

References Cited in the file of this patent

UNITED STATES PATENTS

| Number | Name | Date |
| --- | --- | --- |
| 1,377,589 | Keys | May 10, 1921 |
| 1,965,985 | Morgan | July 10, 1934 |
| 2,311,287 | Boden | Feb. 16, 1943 |
| 2,358,830 | Schick | Sept. 26, 1944 |
| 2,464,989 | Payne | Mar. 22, 1949 |

FOREIGN PATENTS

| Number | Country | Date |
| --- | --- | --- |
| 572,262 | Great Britain | Oct. 1, 1945 |